US012014890B2

(12) United States Patent
Nikolic

(10) Patent No.: US 12,014,890 B2
(45) Date of Patent: Jun. 18, 2024

(54) HIGH-VOLTAGE CIRCUIT BREAKER SYSTEM

(71) Applicant: Siemens Energy Global GmbH & Co. KG, Munich (DE)

(72) Inventor: Paul Gregor Nikolic, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 132 days.

(21) Appl. No.: 17/599,675

(22) PCT Filed: Feb. 17, 2020

(86) PCT No.: PCT/EP2020/054044
§ 371 (c)(1),
(2) Date: Sep. 29, 2021

(87) PCT Pub. No.: WO2020/200566
PCT Pub. Date: Oct. 8, 2020

(65) Prior Publication Data

US 2022/0189722 A1 Jun. 16, 2022

(30) Foreign Application Priority Data

Mar. 29, 2019 (DE) ..................... 10 2019 204 441.7

(51) Int. Cl.
*H01H 3/32* (2006.01)
*H01H 71/10* (2006.01)

(52) U.S. Cl.
CPC .............. *H01H 71/10* (2013.01); *H01H 3/32* (2013.01)

(58) Field of Classification Search
CPC ............ H01H 71/10; H01H 3/32; H01H 3/42; H01H 3/46; H01H 3/3031; H01H 3/3042; H01H 2003/3094; H01H 33/28; H01H 33/42; H01H 2033/6667
USPC ........................................ 200/329, 327, 16 R
See application file for complete search history.

(56) References Cited

U.S. PATENT DOCUMENTS 4,101,746 A * 7/1978 Grieger .................. H01H 33/34 218/84
4,163,133 A 7/1979 Bould
4,563,554 A 1/1986 Perrenoud
4,940,026 A * 7/1990 Fisher ................... F02B 75/243 123/55.6
(Continued)

FOREIGN PATENT DOCUMENTS

CN 103125008 A 5/2013
CN 104143486 A 11/2014
(Continued)

*Primary Examiner* — William A Bolton
(74) *Attorney, Agent, or Firm* — Laurence A. Greenberg; Werner H. Stemer; Ralph E. Locher

(57) ABSTRACT

A high-voltage circuit breaker system has a rapid disconnection function that results in an opening, closing, and reopening movement of a contact system. A circuit breaker having the contact system and a drive system that is mechanically connected to the contact system. The drive system includes a drive unit and, in addition to the drive unit, a drive shaft that is designed as a crankshaft. The crankshaft is connected to a mobile contact of the contact system via a push rod, and the cycle of opening, closing, and reopening movement of the contact system results from a unidirectional rotational movement of the crankshaft.

6 Claims, 5 Drawing Sheets

(56) References Cited

U.S. PATENT DOCUMENTS

| | | | | | |
|---|---|---|---|---|---|
| 5,113,056 | A * | 5/1992 | Kuhn | H01H 3/301 200/82 R | |
| 8,440,930 | B2 * | 5/2013 | Lee | H01H 3/46 218/140 | |
| 2002/0067230 | A1 * | 6/2002 | Yoon | H01H 33/666 335/118 | |
| 2013/0153377 | A1 | 6/2013 | Reuber et al. | | |
| 2015/0060248 | A1 | 3/2015 | Lee | | |
| 2018/0337006 | A1 | 11/2018 | Yeckley | | |

FOREIGN PATENT DOCUMENTS

| | | | |
|---|---|---|---|
| CN | 104425176 | A | 3/2015 |
| CN | 207009355 | U | 2/2018 |
| DE | 102006001241 | A1 | 7/2007 |
| DE | 202008004868 | U1 | 6/2008 |
| DE | 102011119830 | A1 | 6/2013 |
| DE | 102018215507 | A1 | 3/2020 |
| DE | 102019204441 | A1 | 10/2020 |
| EP | 2421017 | A1 | 2/2012 |
| WO | WO 2014/044023 | A1 | 3/2014 |

* cited by examiner

HIGH-VOLTAGE CIRCUIT BREAKER SYSTEM

SPECIFICATION

Field and Background of the Invention

The invention relates to a high-voltage circuit breaker system having a quick disconnection function that results in an opening movement (20), a closing movement (22), and a reopening movement (24) of a contact system (4). The circuit breaker system has a circuit breaker with the contact system (4) and a drive system (6) which is connected mechanically to the contact system (4). The drive system (6) includes a drive unit.

For fault clearing in high and extremely high voltage networks, i.e. with voltages over 110 kilovolt in power lines, what are referred to as quick disconnectors are defined. Should a short circuit be caused, for example, by a tree falling over, a branch falling down or by a large bird, the short-circuit current is interrupted within an extremely short time by means of the breaker. The circuit breaker switches off here in a time of approx. 300 milliseconds and thus disconnects the region in which the short circuit occurs from the remaining network. Since such short circuits frequently regenerate themselves, since, for example, the element generating the short circuit has been burned, the circuit breaker is closed again after a defined time of generally less than one second. If it is determined that the short circuit is no longer occurring, the circuit breaker remains closed. Should the short circuit continue to exist, the breaker has to be opened again within a very short time, i.e. likewise in approx. 300 milliseconds, in order to prevent further damage to the network. This opening then initially remains in place until the cause has been eliminated manually. Such a functionality which generally corresponds to the specifications of the network operator is called open-close-open functionality, O-C-O for short.

Conventional circuit breakers in a high-voltage network have spring accumulator drives for said O-C-O functionality, enabling switching on and switching off again. During the switching operation, in each case one spring accumulator is triggered and the other spring accumulator tensioned in the process, and, in the next switching operation, said triggering and tensioning operation is reversed. Although this design is well established, its implementation, however, requires a relatively high mechanical outlay in each case. In addition, the triggering mechanism for each opening or closing operation is technically complex.

SUMMARY OF THE INVENTION

It is the object of the invention to provide a circuit breaker system for a high-voltage application which has the open-close-open functionality and a technically less complicated drive system than in the prior art.

The object is achieved by a high-voltage circuit breaker system as claimed.

The high-voltage circuit breaker system according to the invention having a quick disconnection function that results in an opening movement, a closing movement and a reopening movement of a contact system, comprises simply this contact system which is connected mechanically to a drive system. The drive system here has a drive unit. In addition to the drive unit, the drive system furthermore comprises a drive shaft which is designed in the form of a crankshaft. Said crankshaft is connected to a mobile contact of the contact system via a push rod. Furthermore, the invention is distinguished in that the cycle of the opening movement, closing movement and reopening movement of the contact system takes place by means of a unidirectional rotational movement of the crankshaft.

In contrast to the conventionally used spring accumulator drives, the advantage of the invention consists in that a drive unit can carry out the required opening, closing and reopening operation in a unidirectional rotational movement during one revolution of a shaft via the crankshaft. This design makes it possible to use simple drive units, for example electric motors or spiral springs. This considerably reduces the technical outlay on the design of the drive unit. The reduced technical outlay also enables the corresponding drive units to be produced more cost-effectively.

A crankshaft is a shaft having one or more cranks which describe an eccentric rotational movement with respect to an axis of rotation of the shaft. A push rod or connecting rod can be fastened to the cranks, as a result of which a rotational movement of the crankshaft is converted into a translational movement. A crank can be a conventional elongate lever, but a crank can also be configured in the form of an eccentric disk.

A quick disconnection function of a circuit breaker involves, in the event of a short circuit, opening the power line for a short time, of the order of magnitude of less than half a second, short-circuiting yet again for a similar period of time, thus enabling checking of a short circuit that is still present, and reopening it again if there is still a short circuit. Should the short circuit have been eliminated during the first disconnection interval, the circuit breaker remains in the closed position.

The term connected mechanically is understood as meaning that, for the transmission of a force, a pulse or an action between two systems, there is a mechanical connection which can take place, for example, via movable connections, such as bearings or joints, but also via fixed connections, such as integrally bonded or force-fitting connections, or from combinations of movable and fixed connections.

In one embodiment of the invention, the crankshaft is designed in such a manner that a unidirectional rotational movement of between 150° and 210° with respect to its axis of rotation is carried out from a closed position of the contact system to an open position of the contact system.

In principle, when a crankshaft is used, a rotational movement of 180° between the closed position and the open position is advantageous. Owing to geometrical requirements or taking opening and closing times into consideration, the optimum rotational movement for the opening operation can lie in a range which differs from 180°, i.e. lies between 150° and 210°.

In a further embodiment of the invention, the crankshaft is designed in such a manner that a unidirectional rotational movement with respect to the axis of rotation of the crankshaft of between 350° and 360° plus 10° is carried out with the cycle of opening movement, closing movement and reopening movement of the contact system. Here too, it is again expedient for a rotational movement of the crankshaft of 360° to take place in principle for the entire cycle. In principle, however, an overrotation or underrotation, that is to say 10° less than 360° or 10° more than 360°, makes it possible, for example, for an increased or reduced contact pressure to be carried out between contacts of the contact system.

The crankshaft is preferably configured in such a manner that a crank pin which is eccentric with respect to the axis of rotation and which, during the rotational movement of the crankshaft, describes a circular movement about the axis of rotation of the crankshaft is arranged at a crank. It is also expedient here for said crank pin to be oriented parallel to the axis of rotation. Furthermore, the crank pin can be surrounded by a plain bearing of the push rod, and therefore the transmission of force and the conversion of the rotational movement into a translational movement is ensured.

In a further embodiment, the crankshaft has at least two cranks, preferably three cranks, which has the advantage that a plurality of circuit breakers can be operated simultaneously by one drive shaft, i.e. by the crankshaft and by a drive. The term two or three cranks is understood in terms of design as meaning that there is at least two or three pins which are each enclosed by a pair of cranks and rotate at an eccentric distance from the axis of rotation of the crankshaft. The terms crank and pair of cranks have an equivalent meaning here since, when more than one crank or pair of cranks is used and when there is rotational movement of virtually or more than 360°, inevitably pairs of cranks are required so as not to block the rotational movement of the push rod.

In a further embodiment, said three cranks or pairs of cranks have different rotational directions with respect to the axis of rotation of the crankshaft. Preferably, the first crank or the first pair of cranks points in one direction, the second pair of cranks in a second direction which is offset by the order of magnitude of 180° from the first crank. The third crank here preferably faces again in the direction of the first crank. In this manner, three circuit breakers can firstly be operated by a common crankshaft and by a common drive; it is also possible, by means of the offset design of the cranks, to move the circuit breakers closer to one another as they are arranged in an offset manner, which results in approximately a triangular arrangement of the circuit breakers. This makes it possible to save a very large amount of construction space for accommodating the circuit breakers.

Further embodiments of the invention and further features will be explained in more detail with reference to the following figures. These are purely exemplary and highly schematic and are intended to explain the basic principles of the configuration in more detail. These are schematic illustrations which do not restrict the scope of protection.

BRIEF DESCRIPTION OF THE FIGURES

FIG. 1 shows the contact system in the closed state.

DETAILED DESCRIPTION OF THE INVENTION

Figure 1:
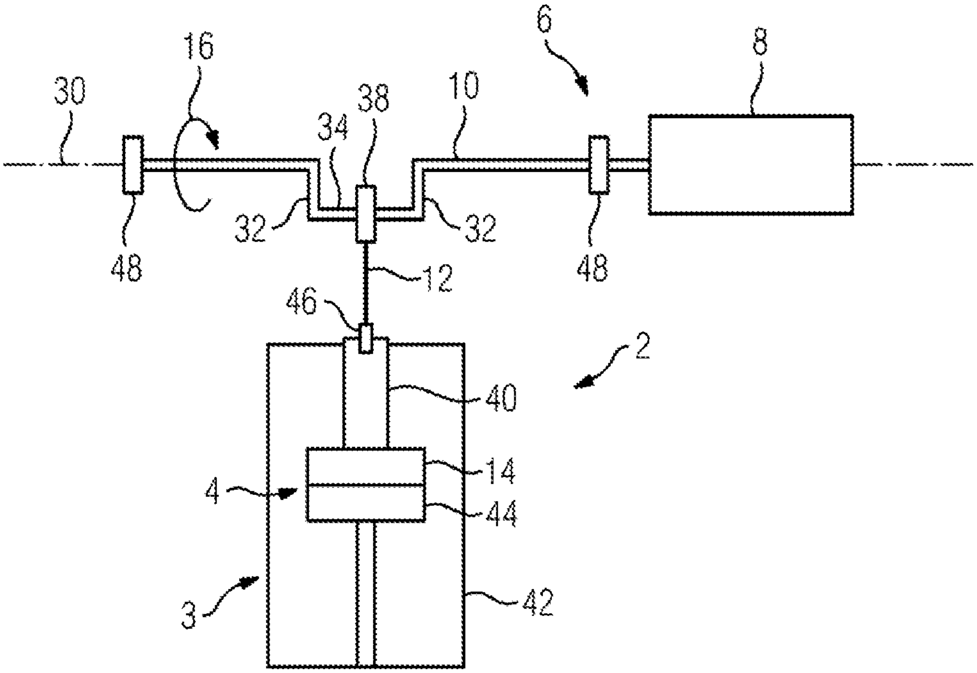
FIG. 1 shows a high-power circuit breaker system having a contact system and a drive system, wherein a crankshaft is used for transmitting the drive energy to the contact system.

FIG. 1 provides a schematic illustration of a high-voltage circuit breaker system which has a contact system 4 which is arranged in a housing 42. The housing 42 here is basically configured to be gas-tight, and an insulating gas which can be, for example, sulfur hexafluoride or a fluoroketone or a fluoronitrile can be present inside the housing. The insulating gas may, however, also be synthetic, purified air. The circuit breaker 2 here can also comprise a vacuum tube. The contact system 4 here has a fixed contact 44 and a mobile contact 14. The mobile contact 14 is connected to a contact bolt 40 which is in turn connected mechanically to a crankshaft 10 via a push rod 12. The push rod 12 can be configured, for example, in the form of a conventional connecting rod. In this configuration, the push rod 12 has a respective plain bearing 38 and 40 at its ends, wherein the plain bearing 38 is fastened to a pin 34 which is part of the crankshaft 10. The pin 34 is framed by two cranks 32 which bring about the eccentric arrangement of the pin 34 from an axis of rotation 30 of the crankshaft 10. The crankshaft 10 in turn is part of a drive system 6 which, in addition to the crankshaft 10, comprises a drive unit 8. Various drive technologies can be used for the drive unit 8. For example, an electric motor can provide the drive, but use may also be made of spiral springs. The crankshaft 10 is mounted here in bearings 48.

Figure 2:
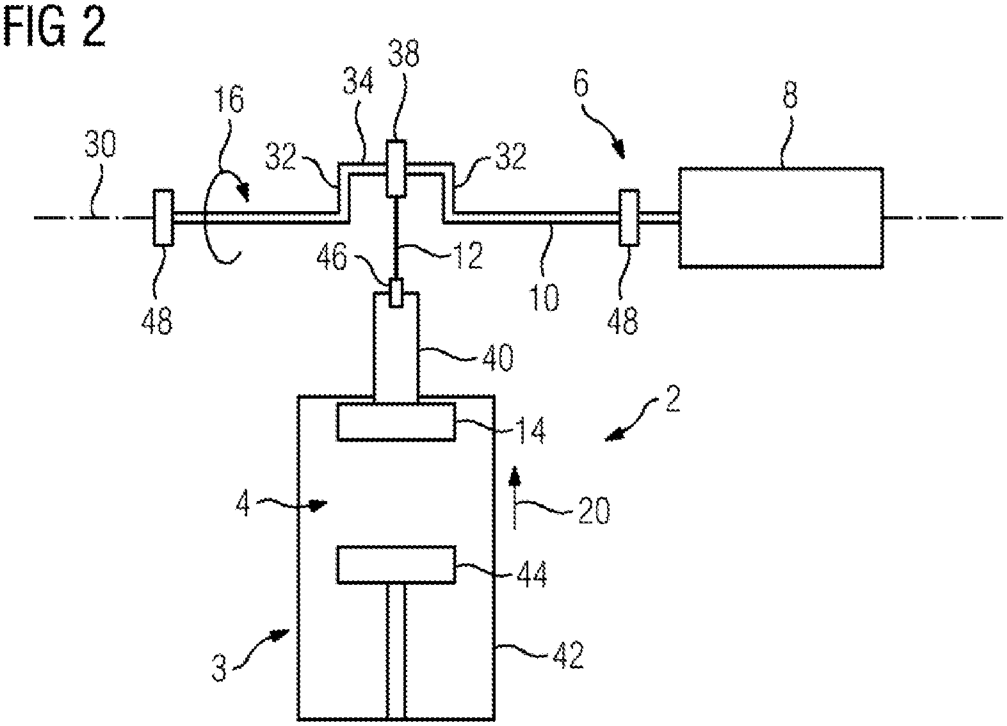
FIG. 2 shows the high-voltage circuit breaker system from FIG. 1 with the crankshaft rotated and with an open state of the contact system.
Figure 3:
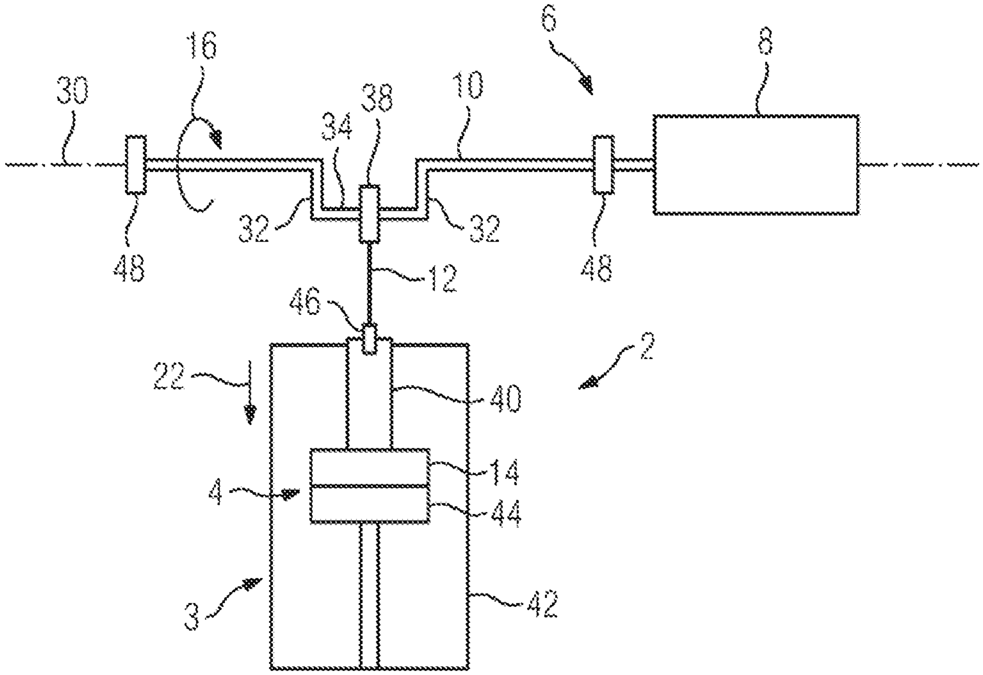
FIG. 3 shows the high-voltage circuit breaker system according to FIG. 1 again in the closed state after rotation of the crankshaft by approx. 180°.
Figure 4:
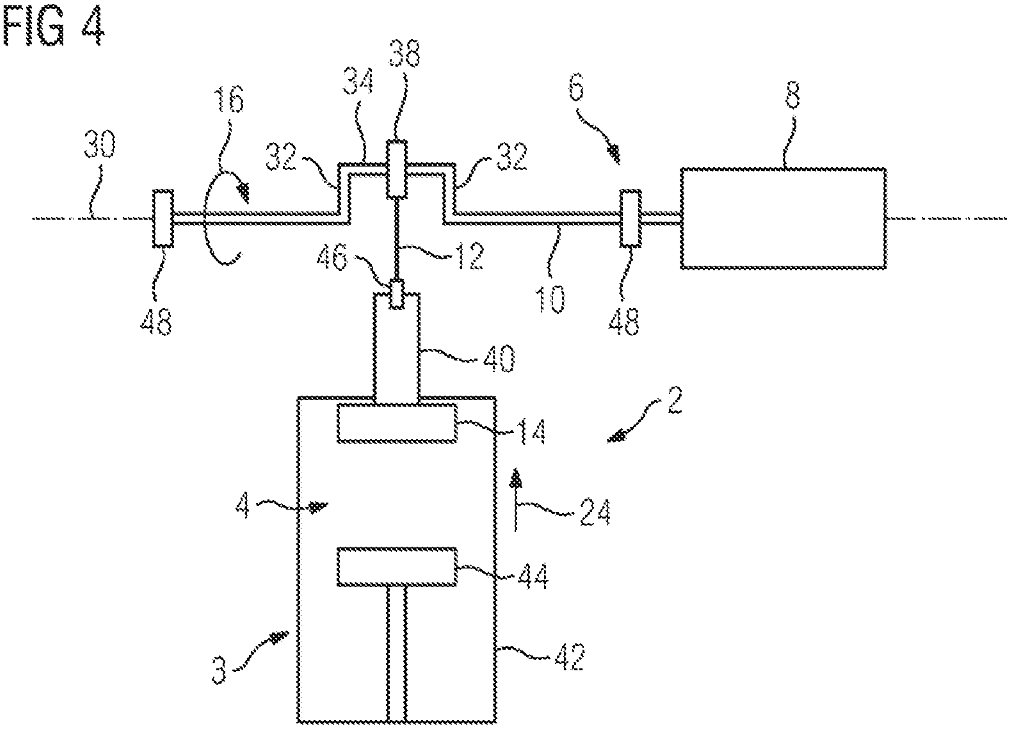
FIG. 4 shows the high-voltage circuit breaker system in the same position as in FIG. 2 after a rotation of the crankshaft of 360°.

The drive unit 8 is configured here in such a manner that it moves in one direction of rotation 16, and therefore the crankshaft 10 likewise carries out a unidirectional rotational movement along the arrow 16. If said rotational movement 16 is carried out once by 360° about the axis of rotation 30 of the crankshaft 10, this first of all leads, as is illustrated in FIGS. 2, 3 and 4, to an opening movement along the arrow 20 according to FIG. 2, with a 180° rotational movement of the crankshaft 10 along the direction of rotation 16 taking place for the maximum opening width of the contact system 4, i.e. the maximum movement of the mobile contact 4. In this case according to FIG. 2, the contact system 4 is maximally open, and a further rotational movement of the crankshaft 10 takes place, preferably without interruption, in the same direction, with the contact system 4 being closed again along the arrow 22, in this case the crankshaft 10 has carried out a rotational movement of 360°.

Should it have turned out here that the cause of the short circuit continues to exist, a triggering unit, not illustrated here, gives the signal for a further 180° movement of the crankshaft 10, which means a further opening movement along the arrow 24 according to FIG. 4. At this point, according to FIG. 4, the cycle which includes an opening operation, a closing operation and a renewed opening operation, is ended. The high-voltage circuit breaker 2 remains initially open at this point.

Figure 7:
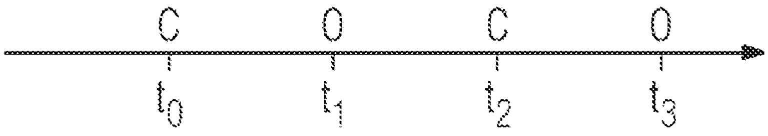
FIG. 7 shows a time axis to show the opening and closing cycle.

FIG. 7 schematically shows this cycle along a time axis. For the period of time before and at the time $T_0$ there is no short circuit or confirmation in some other way of the network, and therefore the high-voltage circuit breaker 2 is closed in its basic position.

At the time $T_0$, there is a triggering event caused by a triggering unit, and the circuit breaker 2 is guided, according to FIG. 2, as far as the time $T_1$ into an open position which is indicated by O. This period of time lasts approximately 300 milliseconds. For a further period of time which may be between 100 milliseconds and a second, the breaker is again closed, according to FIG. 3; this is at the time $T_2$. Should the event causing a short circuit continue to be present, there is a further opening movement as far as the time $T_3$, according to FIG. 4.

Figure 5:
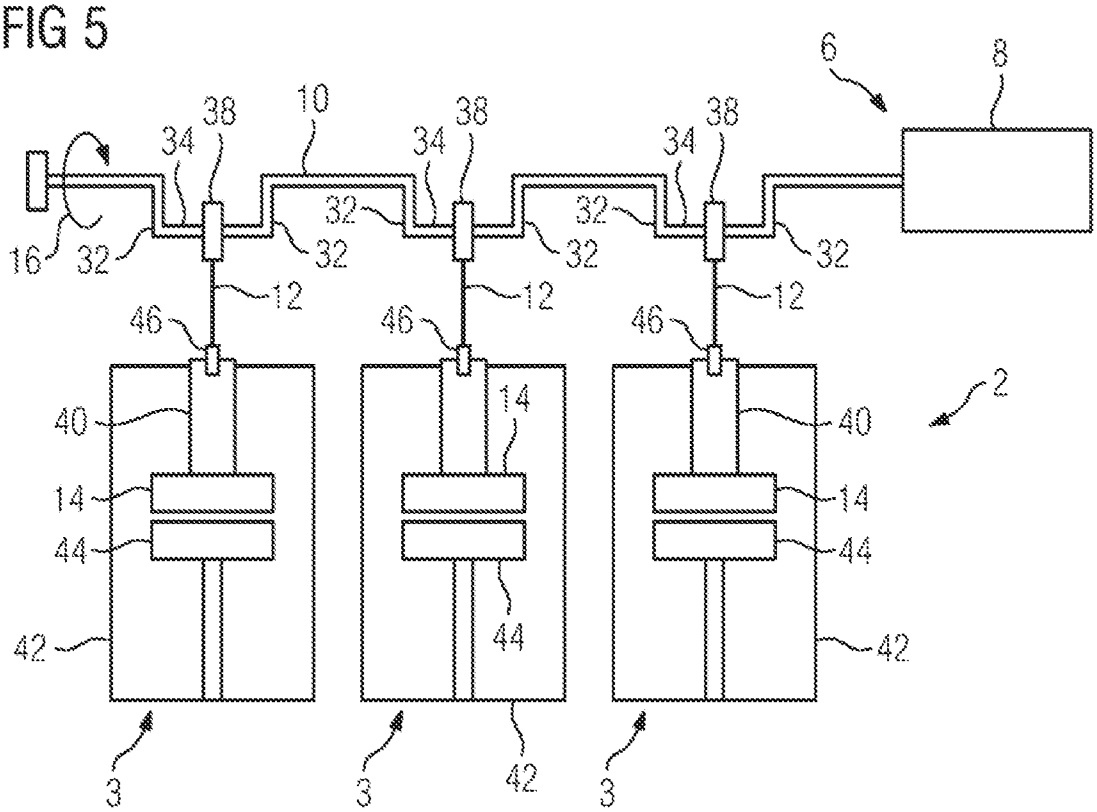
FIG. 5 shows a series of high-voltage circuit breaker systems for three phases which are driven by a drive system with a drive and a crankshaft.

FIG. 5 illustrates a circuit breaker system 2 in which three circuit breakers 3 are arranged next to one another and are jointly driven by a drive system 6. The crankshaft 10 according to FIG. 5 has three cranks 32 which are each connected to a circuit breaker 3.

The three circuit breakers 3 are breakers for the individual phases of a power network, by means of which switching can be carried out simultaneously in the circuit breaker system 2 using one drive system 6. The sequences of the rotational movement along the arrow 16 correspond to that which is described with respect to FIGS. 1 to 4.

Figure 6:
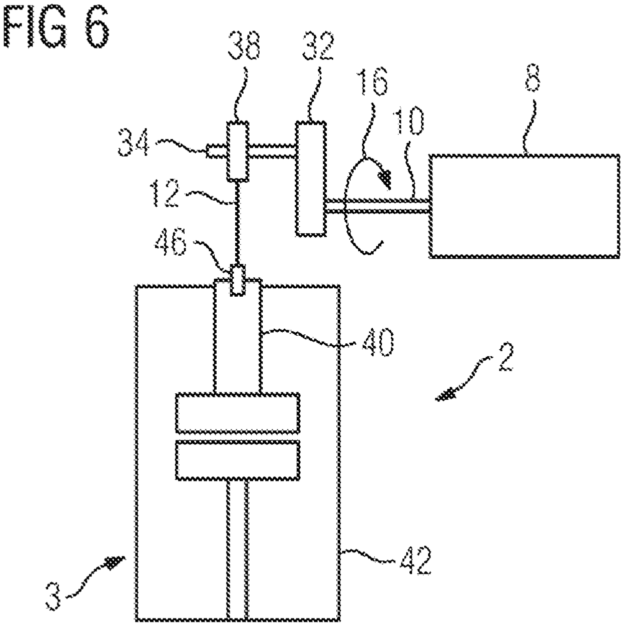
FIG. 6 shows a high-voltage circuit breaker system with a crankshaft which has an eccentric disk as crank.

FIG. 6 illustrates an analogous circuit breaker system 2 which basically carries out the same movement sequences as already described with respect to FIGS. 1 to 4. However, the system 2 differs in the shape of the crankshaft 10, wherein the crank 32 of the crankshaft 10 is configured in the form of an eccentric disk and is arranged at one end of the crankshaft 10. In this case, only a crank 32 and not a pair of cranks is required, and the crank pin 34 is arranged at the crank 32 in the form of an eccentric disk without a counterbearing in a second crank.

Figure 8:
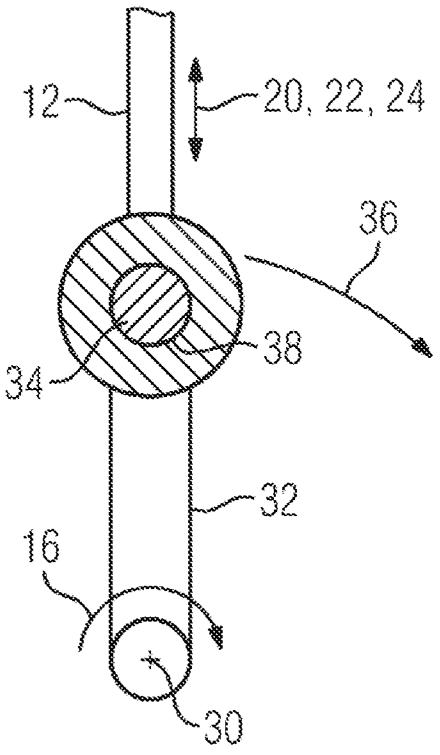
FIG. 8 shows a cross section through a crankshaft along a crank and a push rod attached thereto.
Figure 9:
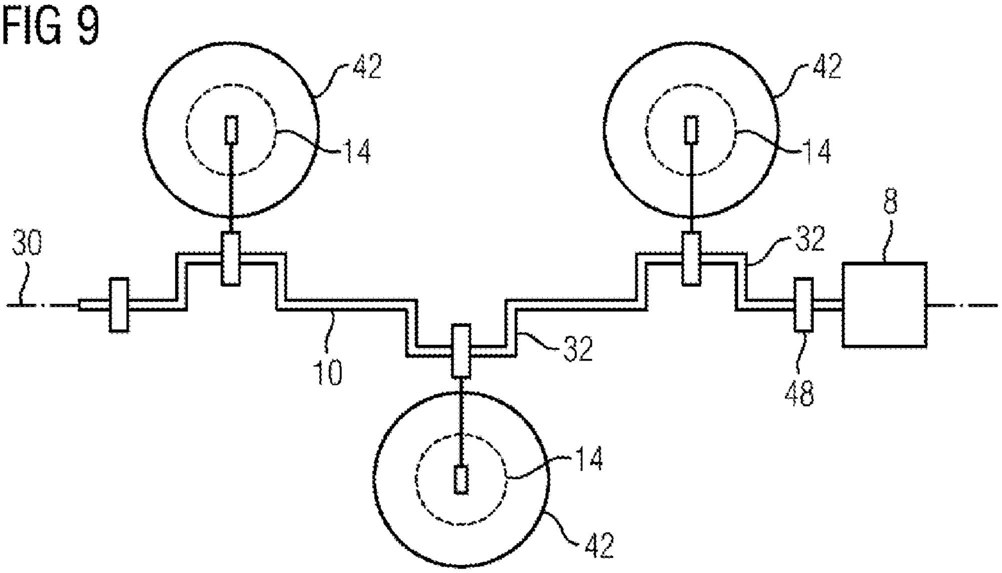
FIG. 9 shows a top view of an arrangement of three high-voltage circuit breaker systems, analogously to FIG. 5, but with cranks arranged offset rotationally with respect to the axis of rotation.

FIG. 8 illustrates a cross section through a crankshaft 10 in the region of the crank pin 34 between two cranks 32. It is shown here how the plain bearing 38, which is in turn connected to a push rod 12, is arranged around the crank pin 34. It is also apparent in FIG. 8 how the crank pin 34 describes a rotational movement 36 eccentrically with respect to the axis of rotation 30 and, in the process, can carry out unidirectionally a rotation about initially 360° for the opening and closing and then optionally by a further 180°. That end of the push rod 12 which is provided with a further plain bearing (see FIG. 1 reference sign 46) is in engagement with the contact bolt 40, which is not illustrated specifically here.

Figure 10:
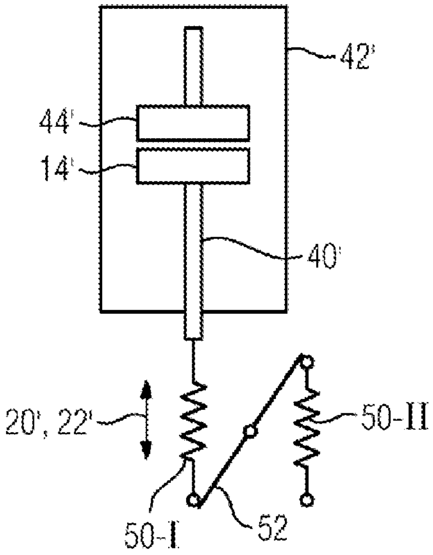
FIG 10 (Prior art)
FIG. 10 shows a high-voltage circuit breaker system with a drive mechanism according to the prior art.

FIG. 10 finally provides an illustration of a drive mechanism of a high-voltage circuit breaker system according to the prior art. The features having the same names as in the preceding figures are provided with the same reference signs followed by a prime. Such a circuit breaker system also has a contact system 4' which comprises a fixed contact 44' and a mobile contact 14' which is in turn operatively connected to a contact bolt 40'. The contact system 4' is surrounded by a housing 42'. The difference over the previous description consists in that the cycle of opening and closing and reopening, that is illustrated by the arrows 20', 22', is implemented by a complex spring mechanism, wherein two spring accumulators 50-I and 50-II are connected via a toggle lever 52, which is illustrated highly schematically here. The toggle lever 52 has the effect that, when the contact system 4' is opened, one spring accumulator 50-I is relaxed and, by contrast, the spring accumulator 50-II is tensioned. This operation is reversed during a further opening and closing movement. This is an extremely complex mechanical arrangement which can alternatively be realized by the technically simpler embodiment of the crankshaft 10 described.

LIST OF REFERENCE SIGNS

2 High-voltage circuit breaker system
3 Circuit breaker
4 Contact system
6 Drive system
8 Drive unit
10 Crankshaft
12 Push rod
14 Mobile contact
16 Unidirectional rotational movement
20 Opening
22 Closing
24 Reopening
26 Closed position
28 Open position
30 Axis of rotation
32 Crank
34 Fastening pin
36 Circular rotational movement
38 Plain bearing
40 Contact bolt
42 Housing
44 Fixed contact
46 Second plain bearing
48 Crankshaft bearing
50 Spring accumulator
52 Toggle lever

The invention claimed is:

1. A high-voltage circuit breaker system having a quick disconnection function, the circuit breaker system comprising:
- a circuit breaker having a contact system and a drive system mechanically connected to said contact system;
- said drive system including a drive assembly and a drive shaft being a rotatably mounted crankshaft;
- said crankshaft having at least three cranks, with a second crank of said crankshaft being deflected rotationally in a different direction from a first crank of said crankshaft;
- a push rod connecting each crank of said crankshaft to a movable contact of said contact system;
- said crankshaft and said push rod being configured to perform the quick disconnection function with a cycle of an opening movement, a closing movement, and a reopening movement of said contact system caused by a unidirectional rotational movement of said crankshaft; and
- said crankshaft having an axis of rotation and said crankshaft being configured to carry out the unidirectional rotational movement with respect to said axis of rotation of between 150° and 210° from a closed position of said contact system to an open position of said contact system.

2. The high-voltage circuit breaker system according to claim 1, wherein said crankshaft is configured to carry out the rotation about said axis of rotation of between 350° and 360° plus 10° for the opening movement and closing movement of said contact system.

3. The high-voltage circuit breaker system according to claim 1, wherein said crankshaft includes a crank pin at a crank thereof which is eccentric with respect to an axis of rotation of said crankshaft and which, during the rotational movement of said crankshaft, describes a circular movement about said axis of rotation.

4. The high-voltage circuit breaker system according to claim 3, wherein said crank pin is oriented parallel to said axis of rotation.

5. The high-voltage circuit breaker system according to claim 4, wherein said push rod includes a plain bearing disposed to surround said crank pin.

6. A high-voltage circuit breaker system having a quick disconnection function, the circuit breaker system comprising:

a circuit breaker having a contact system and a drive system mechanically connected to said contact system;

said drive system including a drive assembly and a drive shaft being a rotatably mounted crankshaft;

said crankshaft having at least three cranks, with a second crank of said crankshaft being deflected rotationally in a different direction from a first crank of said crankshaft;

a push rod connecting each crank of said crankshaft to a movable contact of said contact system;

said crankshaft and said push rod being configured to perform the quick disconnection function with a cycle of an opening movement, a closing movement, and a reopening movement of said contact system caused by a unidirectional rotational movement of said crankshaft; and said crankshaft having an axis of rotation and said crankshaft being configured to carry out the rotation about said axis of rotation of between 350° and 360° plus 10° for the opening movement and the closing movement of said contact system.

* * * * *